US007069248B2

(12) United States Patent
Huber

(10) Patent No.: US 7,069,248 B2
(45) Date of Patent: Jun. 27, 2006

(54) METHOD FOR CONFIRMING TRANSACTIONS

(75) Inventor: Adriano Huber, Locarno (CH)

(73) Assignee: Swisscom Mobile AG, Bern (CH)

( * ) Notice: Subject to any disclaimer, the term of this patent is extended or adjusted under 35 U.S.C. 154(b) by 288 days.

(21) Appl. No.: 10/228,782

(22) Filed: Aug. 27, 2002

(65) Prior Publication Data

US 2003/0050081 A1    Mar. 13, 2003

Related U.S. Application Data

(63) Continuation of application No. PCT/CH00/00116, filed on Feb. 29, 2000.

(51) Int. Cl.
*G06Q 99/00* (2006.01)
(52) U.S. Cl. .............................. 705/64; 705/44; 705/67
(58) Field of Classification Search .................. 705/64, 705/67, 44; 370/252, 352; 380/277, 278; 455/426; 713/201, 168; 379/189
See application file for complete search history.

(56) References Cited

U.S. PATENT DOCUMENTS

| 5,757,916 | A  | * | 5/1998  | MacDoran et al. ............ 705/64 |
| 5,883,810 | A  |   | 3/1999  | Franklin et al. ............ 235/380 |
| 6,031,904 | A  | * | 2/2000  | An et al. ................... 370/352 |
| 6,148,405 | A  | * | 11/2000 | Liao et al. .................. 380/278 |
| 6,157,707 | A  | * | 12/2000 | Baulier et al. ............... 379/189 |
| 6,223,291 | B1 | * | 4/2001  | Puhl et al. ................... 713/201 |
| 6,338,140 | B1 | * | 1/2002  | Owens et al. ............... 713/168 |
| 6,421,781 | B1 | * | 7/2002  | Fox et al. ................... 713/201 |
| 6,466,571 | B1 | * | 10/2002 | Dynarski et al. ........... 370/352 |
| 6,480,957 | B1 | * | 11/2002 | Liao et al. ................. 380/277 |
| 6,600,734 | B1 | * | 7/2003  | Gernert et al. .............. 370/352 |
| 6,895,394 | B1 | * | 5/2005  | Kremer et al. ................ 705/67 |
| 2002/0035699 | A1 | * | 3/2002 | Crosbie ..................... 713/201 |
| 2002/0111164 | A1 | * | 8/2002 | Ritter ......................... 455/426 |

FOREIGN PATENT DOCUMENTS

| EP | 0 813 325 A2 | 12/1997 |
| WO | WO 98/37524 | 8/1998 |
| WO | WO 99/56434 | 11/1999 |

OTHER PUBLICATIONS

Hoogenboom, M. et al: Security for Remote Access and Mobile Applications, Computers & Security. International Journal Devoted to the Study of Technical and Financial Aspects of Computer Security, NL, Elsevier Science Publishers. Amsterdam, Bd. 19, Nr. 2, Feb. 2000 pp. 149-163, XP004204675.

Compressibility of WML and WML Script byte code: Initial Results, Eute Ojanen and Jari Veijalainen, Department of Computer Science and Information Systems, University of Jyvaskyla, Finland, pp. 55-62, Jul. 2000.

* cited by examiner

*Primary Examiner*—Salvatore Cangialosi
(74) *Attorney, Agent, or Firm*—Pearne & Gordon LLP

(57) ABSTRACT

Method with which a mobile user can confirm a transaction with a service provider, in which:
  an offer of said service provider is reproduced with the mobile device of said mobile user,
  said mobile user selects said offer with input means of his mobile device,
  a transaction confirmation is automatically forwarded from said mobile device to an authentication server, a plurality of transactions between different mobile users and different service providers being stored in said authentication server,
  and said service provider retrieves said confirmation from said authentication server.

49 Claims, 2 Drawing Sheets

| *# | SRQ | * | SP-CODE | TS1 | SES-ID | Rd-NR | USER-D | KEY | F1, F2 |

Fig. 2

| SP-CODE | TS1 | SES-ID | Rd-NR | CYPH | TS2 | SIG2 | USER-D |

Fig. 3

METHOD FOR CONFIRMING TRANSACTIONS

This application is a Continuation of PCT/CH00/00116, filed on Feb. 29, 2000.

The present invention concerns a method with which a mobile user can confirm a transaction with a service provider in a mobile radio network.

Different methods are already known that allow a mobile user to establish a session with a service provider and conduct transactions, for example for ordering products or information or for carrying out money transactions. With WAP (Wireless Application Protocol), so-called WAP cards from different service providers can for example be made available and displayed to mobile users with appropriate WAP browsers in WAP-capable mobile devices. Each card may contain one or several offers that can be selected by the mobile user through suitable input means, for example to order a product or information.

It has furthermore also been described how a web page can be transmitted over a mobile radio network and reproduced on a mobile device (for example a palmtop or laptop with radio interface).

If the mobile user wishes to conduct a transaction with a WAP or web service provider, he has to select the corresponding offer, for example by clicking the offer on a graphical interface or with a keyboard. A transaction confirmation is then automatically prepared and transmitted to the service provider.

In order for the service provider to be certain that the transaction confirmation was indeed sent by the indicated mobile user, it is necessary to provide an identification mechanism. For this purpose, the browser in the mobile device or in the WIM card of the mobile device for example can sign the transaction confirmation with a private key located in a certificate certified by a third party. The service provider can then verify the user's signature with the user's public key and in this manner check his identity.

This authentication method can however only be used if the mobile device of the mobile user has signature means, among others if it has a certificate that has been certified by a certification authority recognised by the service provider, as well as a suitable signature module. Additionally, the service provider must have the matching public key of the mobile user. Simple or older mobile devices however do not have such appropriate signature means. Furthermore, many certification authorities are recognised only nationally or by certain user groups, so that this method cannot be used between every mobile user and every service provider.

It is an aim of the present invention to propose a new confirmation method for transactions with mobile devices.

It is another aim to propose a new transaction confirmation method that can also be used by mobile devices without signature module and by those mobile devices that have no certificate certified by a certification authority recognised by the service provider.

According to the present invention, these aims are achieved in particular through the characteristics of the independent claims. Further advantageous embodiments are moreover described in the dependent claims and in the description.

In particular, these aims of the invention are achieved with a method in which the transaction confirmation is forwarded automatically from/by the mobile device to an authentication server, a plurality of transactions between different mobile users and different service providers being stored in said authentication server. The service provider can then retrieve the confirmation from said authentication server.

This has the advantage that mobile users can have themselves identified with the same authentication server for all transactions with different service providers, instead of having to be capable of authentication with every server of every service provider.

If said authentication server is administered by the mobile radio operator or an operator with a special agreement with the mobile radio operator, simplified authentication processes can be applied that use the mobile user's identity stored in the identification module in the mobile device.

In a preferred embodiment, said confirmation sent by said mobile device consists of a USSD message that is forwarded to a certain authentication server (for example to a server of the mobile radio network) on the basis of a predetermined Service Request Code. This embodiment makes it possible to identify the mobile user easily in the HLR of the home mobile radio network and to use this identity in the authentication server.

Hereafter, preferred embodiments of the invention will be described in more detail with the aid of the attached figures, in which:

FIG. 2 shows diagrammatically the structure of a confirmation message that is sent by a mobile user to the authentication server.

FIG. 3 shows diagrammatically the structure of a confirmation message that is stored in the authentication server.

Figure 1:
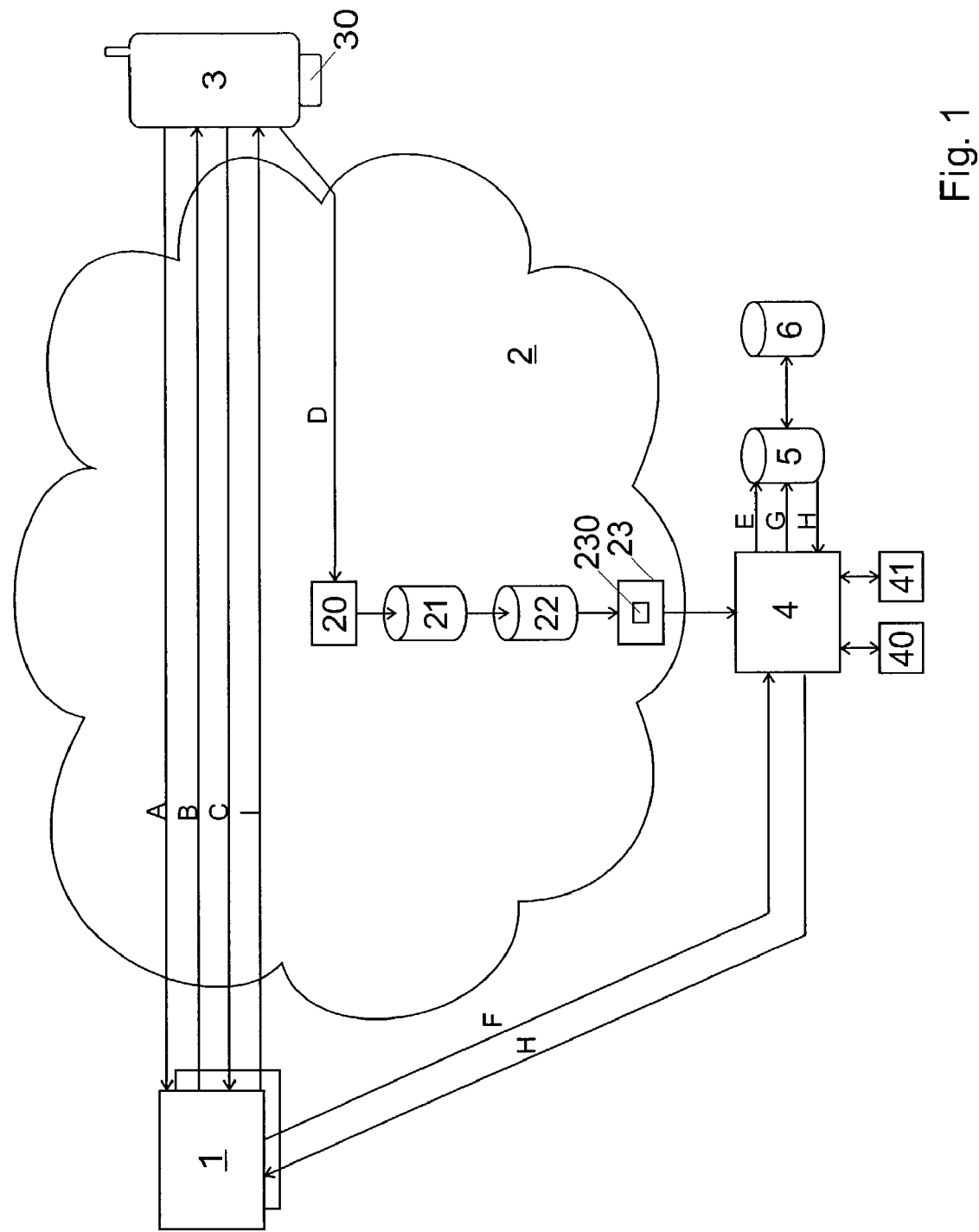
FIG. 1 shows a block diagram representing diagrammatically a system in which a mobile user confirms a transaction with a service provider with an authentication server.

Although several details of this invention's description relate to the special case of an embodiment in a GSM mobile radio network, the one skilled in the art will understand that this method can also be used with other types of mobile networks, for example with AMPS, TDMA, CDMA, TACS, PDC, HSCSD, GPRS, EDGE or UMTS mobile radio networks, in particular with WAP (Wireless Application Protocol)—capable mobile radio networks. This invention can furthermore be used in other networks, in particular in the Internet or in a local network according to Bluetooth or HomeRF.

In FIG. 1, the reference number 1 refers to a service provider who makes available an offer (for example a product or information). The service provider preferably operates a server (for example an http or WAP server) in which HTML pages (Hypertext Markup Language) resp. WML cards (Wireless Markup Language) are stored. On each page or card, text, images and/or hypertext elements can be located. At least one element on a page or card corresponds to an offer that can be selected by a mobile user.

Each page or card has an address, for example a URL address (Uniform Resource Locator), in the telecommunication network 2. The telecommunication network 2 is preferably a mobile radio network (for example a GSM or UMTS mobile radio network, or Internet, or a local network according to Bluetooth). Mobile users can log into the mobile radio network 2 with their mobile devices 3 and establish a session with a service provider 1 by entering the known URL address in a browser in the mobile device 3. There are several service providers 1 and several mobile devices 3 in the mobile radio network.

The mobile devices 3 consist for example of a computer (e.g. palmtop or laptop) with a mobile radio interface (for example with a mobile device in PC card format or with a contactless interface to a mobile radio telephone) and of a web and/or WAP browser capable of reproducing HTML and/or WML pages. In a preferred embodiment, at least certain mobile devices consist of WAP-capable mobile devices (for example of mobile radio telephones with a WML-capable browser). Mobile devices 3 are identified in the mobile radio network 2 on the basis of an identification module 30 connected with the mobile device, for example on the basis of a SIM (Subscriber Identification Module), WIM (WAP Identification Module) or UIM (UMTS Identification Module) chip-card, in which an unambiguous and non-falsifiable user identity, for example an IMSI (International Mobile Subscriber Identification) is stored.

The mobile radio network 2 preferably comprises at least one MSC (Mobile Service Switching Center) 20, at least one VLR (Visitor Location Register) 21 and at least one HLR (Home Location Register) 22. The HLR 22 is administered by the network operator from whom the mobile user has acquired the identification module 30. A USSD handler 23 is contained in, or connected with, the HLR 22 and checks all received USSD messages in order to decide which action is to be carried out with it. A filter 230 in this USSD handler 23 recognizes among others the USSD messages put to use for the method according to the invention and specially marked, and forwards them to the authentication server 4 as will be described further below.

USSD messages (Unstructured Supplementary Service Data) have been defined and standardized among others in Standard GSM 02.90 of the European Telecommunications Standards Institute (ETSI).

The reference number 4 refers to an authentication server, for example a UNIX, LINUX or Windows server that is operated for example by the operator of the mobile radio network 2 or by an authority with a special agreement with this operator, in order that specially marked USSD messages be forwarded thereto. The server 4 contains, or is connected with, a database 5 in which transaction confirmations are stored. An additional user database 6 contains user indications, for example the name, address etc. It is additionally possible to store in the server different applications 40, 41, . . . , that are executed upon receipt of a certain USSD message, as will be described further below. The server 4 can for example contain an http- or FTP server and be connected to the Internet over a router (not represented).

Each service provider 1 can access the server 4 over an appropriate telecommunication network (for example over Internet) (not represented), in order to retrieve transactions that concern him, e.g. with an http or CORBA protocol. The sessions between the service providers 1 and the server 4 are preferably secured, for example according to the SSL (Secure Sockets Layer), TLS (Transport Layer Security) or WTLS (Wireless Transport Layer Security) protocol. The authentication sever 4 furthermore has signature means (not represented), with which messages and sessions with the service providers 1 can be secured.

An example of the method according to the invention carried out with this system will now be described in further detail.

The mobile user can have an offer of the service provider 1 displayed by his mobile device 3 by entering the URL address of the corresponding WAP card or web page in a browser (arrow A). The WML resp. HTML page is then transmitted over the telecommunication network 2 (for example over a cellular mobile radio network or Internet) (arrow B) and reproduced by the browser 3 in a suitable form on the display or with other reproduction means of the mobile device 3. The sessions between the service provider 1 and the mobile user 3 can be secured or not.

The WAP card resp. web page can for example contain one or several hyperlink elements or other graphical command elements (for example clickable buttons or selection boxes) that can be selected by the mobile user with appropriate command elements in order to chose the corresponding offer on the card or page.

Once the offer has been selected, a script is prepared (for example a WML, Java or Javascript script) that causes a USSD message to be prepared and sent (arrow D). The entire USSD message is preferably indicated in the script transmitted with the web page or WAP card; it is however also possible for at least certain fields of the USSD message to be determined by the processor in the mobile device 3 or in the identification module (for example on the basis of the indications available in the mobile device).

The structure of a preferred example of USSD is represented in FIG. 2. In this example, the USSD message contains, from left to right, a first boundary sign (in this example *#), followed by a three-digit service code SRQ. According to the aforementioned GSM 02.90 standard, the service code can have any value in the range from 100 to 1999. The service code SRQ determines where the USSD message is to be forwarded, in particular whether it is to be handled by the VLR of the visited mobile radio network or by the HLR of the home network. The value of the SRQ field is set in this application for all USSD so that all transaction confirmations are sent as USSD to the server 4, as will be described further below.

A second boundary sign is used after the service code SRQ (in this example a *). After this sign follows an SP code field 23 with an identification of the service provider 1, preferably an identification that is also known to the operator of the network 4, for example its URL address or the title of the WAP card or web page, or simply a number.

The next field TS1 contains a time stamp set by the service provider 1 and indicating the date and time of the transmission of the WAP card or web page. The field SES-ID contains an identification through the network 2 of the session during which the WAP card or web page was transmitted, said identification being defined by the service provider 1.

The field Rd-Nr contains a secret by the service provider (for example a generated random number that is different for each transmitted copy of the WAP card or web page and that cannot be guessed by the mobile user).

The field USER-D contains the indications available in the mobile device 3 or in the identification module 30, for example the identity (for example the IMSI) of the mobile user, his electronic signature, his location, his language, his order preferences, etc. It is also possible to complete the USSD message with indications from an external device, for example from a POS (Point-of-Sale) at close range, transmitted over a contactless interface (according to Bluetooth, HomeRF or IrdA). In a preferred embodiment, the identity of the mobile user, as well possible as other parameters, are encrypted.

The field KEY contains an encryption key with which data entered by the mobile user or determined by the mobile device can be encrypted in order to determine a field CYPHER that can be decrypted only by the service provider 1.

Additional fields F1, F2, . . . can furthermore be set in order to have certain applications executed in the authentication server 4, as will be described further below.

The one skilled in the art will understand that this structure of a USSD message has been given only by way of example and that additional fields can be provided whilst the fields described here above are optional. It is for example well conceivable to send also datagrams, i.e. messages with fields that contain an executable program or program element, for example with a JAVA applet (trademark of SUN Microsystems, Inc.).

The USSD message prepared in the mobile device 3 is forwarded through the MSC (Mobile Service Switching Center) 20, the VLR (Visitor Location Register) 21 and the HLR (Home Location Register) 22 to the USSD handler 23 (arrow D), where it is sorted on the basis of the SRQ value by the filter module 230 and forwarded further to the authentication server 4. Preferably, a confirmation is prepared by said script (arrow C) and sent with a suitable bearer (E-mail, SMS etc.) directly to the service provider 1 as soon as the mobile user has selected an offer.

In the authentication server 4 the USSD message is received and preferably completed with additional fields TS2 and/or SIG2 (FIG. 3). The field TS2 contains a time stamp that is set by the authentication server upon receipt of the USSD message and which indicates the receiving date and time.

The authentication server 4 furthermore finds out from the USSD handler 23 the identity of the mobile user 3, for example his IMSI. The one skilled in the art will note that this IMSI cannot be falsified and that it is not possible to send a USSD message with the IMSI of another mobile user. In a preferred embodiment, these user indications are linked with additional indications from a user database 6, for example with the billing and/or delivery address.

The authentication server 4 then stores the completed message in a transaction database 5 (arrow E) in which a plurality of transactions between different service providers and different mobile users are stored. In the database 5, an index is preferably compiled on the basis of the field SP-code, so that the stored data can be quickly sorted according to the service provider.

Different applications 40, 41, . . . in the server 4 can furthermore be executed if a Flag F1, F2, . . . has been set or if particular conditions are fulfilled to trigger a certain action. If the server 4 is operated by the operator of the mobile radio network 2, it is for example possible to charge a fee to an account of the mobile user 3 and/or of the service provider 1.

The service provider 1 can send a query F to the server 4 to check whether transaction confirmations have been stored in the database 5. Queries can be sent for example periodically, upon receipt of the confirmation C or after a predetermined time after the WAP card or web page has been downloaded. The query is transmitted for example through the Internet or through a mobile radio network during a preferably secured session. Preferably, in the authentication server 4, the identity of the service provider 1 is checked (for example on the basis of known authentication mechanisms with electronic signatures, with a password or generally with a shared secret) and the access authorization of the service provider 1 to the content of the transaction database 5 is tested. If the result of this check is positive, the query is forwarded to the transaction database 5 (arrow G), which answers with the transaction confirmation represented in FIG. 3 (arrow H). This reply is then preferably electronically signed and/or encrypted by the server 4 and forwarded to the service provider 1 (arrow H).

In a variant embodiment of the invention, the user identification (USER-D) is removed from the reply (arrow H) so that the user remains anonymous towards the service provider. In this manner, it is possible also for the service provider 1 to effect payments anonymously.

In a variant embodiment of the invention, the service provider does not have to send himself queries to the authentication server 4, but is informed by it if a transaction confirmation has been received. For this purpose, a script can be provided in the server 4 that automatically forwards confirmations, or preferably only specially marked confirmations, to the corresponding service provider.

The service provider can then reliably identify the mobile user on the basis of the received confirmation. On the basis of the session identification SES-ID, of the time stamp TS1, of the random number Rd-Nr and possibly of the other fields set by the mobile device 3 and/or by the server 4, he can additionally check whether the received data really correspond to a WAP card or web page sent by him.

In this manner, the service provider 1 can be certain that the mobile user 3 is indeed the source of the received confirmation and can thus perform the transaction, for example by sending an ordered product and/or by sending the offered information over the mobile radio network 2. Preferably, a confirmation is sent to the mobile user (arrow I).

The one skilled in the art will understand that other messages than USSD messages can also be used in the framework of this invention. It is furthermore possible to use several authentication servers 4 that can for example be reached with other SRQ codes. In this manner, a service provider can, by selecting another SRQ code, decide in which authentication server 4 the authentication data for a certain transaction can be stored.

Use of the authentication server 4 can for example be billed in the framework of user contracts between the operator of the server 4 and the service providers 1, the billed price being for example dependent on the number of the received transactions. For this purpose, a transaction counter counting the number of transactions for each service provider 1 during a predetermined period of time can be provided in the server 4.

Preferably, a profile for each registered service provider 1 is stored in the server 4, in which among others the service provider's identity, the corresponding SP code, possibly his billing address and possibly his preferences (for example the manner in which the transaction confirmations are to be stored in the transaction database 5) are stored.

The invention claimed is:

1. A method for providing an authentication service, with which one of a plurality of users each using a corresponding mobile device confirms a transaction with a corresponding server of one of a plurality of service providers using a central authentication server, said method comprising the steps of:

the server of said one of the service providers sending display data to said mobile device without using said central authentication server, said data for displaying one or more products or services provided by the one of the service providers to the one of the users which can be purchased by the one of the users;

said one of the users using input means of said mobile device for selecting one or more of said products or services for purchase;

said mobile device automatically forwarding transaction confirmation data to the central authentication server;

said one of said service providers using said server for retrieving said transaction confirmation data from said central authentication server; and billing one or more of said users and said service providers for said authentication service, wherein said central authentication server is configured to provide authentication of various transactions between each of said plurality of users via the user's corresponding mobile device and various ones of the plurality of service providers via the service provider's servers such that the plurality of service provides and the plurality of users utilize said central authentication server in common.

2. The method of claim 1, wherein said display data is included in a WAP card of said service provider that is reproduced by a browser in said mobile device.

3. The method of claim 1, wherein said display data is included in a web page that is reproduced by a browser in said mobile device.

4. The method of claim 1, wherein said transaction confirmation data sent by said mobile device includes a USSD message.

5. The method of claim 4, wherein said USSD message is automatically prepared and sent by a script contained in a WAP card or web page when said mobile user selects said display data on this card resp. page.

6. The method of claim 5, wherein said script is a WML script.

7. The method of claim 1, wherein said transaction confirmation data includes a service provider identification.

8. The method of claim 1, wherein said transaction confirmation data includes a time stamp from said service provider.

9. The method of claim 1, wherein said transaction confirmation data includes a session identification.

10. The method of claim 1, wherein said transaction confirmation data includes a secret known only to the service provider.

11. The method of claim 10, wherein said secret is a random number set by said service provider.

12. The method of claim 1, wherein said transaction confirmation data includes an identification of the user.

13. The method of claim 1, wherein at least one part of said transaction confirmation data is prepared by a script in said mobile device.

14. The method of claim 1, wherein at least one part of said transaction confirmation data is encrypted by a script in said mobile device with a key of the service provider.

15. The method of claim 1, wherein said transaction confirmation data includes a datagram that is executed by said authentication server.

16. The method of claim 1, wherein said transaction confirmation data includes at least one flag that causes the execution of an application in said authentication server.

17. The method of claim 1, wherein said transaction confirmation data is stored in a transaction database in said authentication server.

18. The method of claim 17, wherein said authentication server contains a user database in which mobile user indications are stored, and in that at least certain of these mobile users are linked with said transaction confirmation data in said authentication server.

19. The method of claim 1, wherein said transaction confirmation data is signed by said authentication server.

20. The method of claim 1, wherein said transaction confirmation data is provided upon receipt with a time stamp by the authentication server.

21. The method of claim 1, wherein said transaction confirmation data is stored in said authentication server and in that said service provider sends a query to said authentication server to check whether the transaction confirmation data has arrived.

22. The method of claim 21, wherein said authentication server comprises a http server and in that said service provider connects over the Internet with said authentication server to check whether said transaction confirmation data has arrived.

23. The method of one claim 21, wherein said service provider must authenticate itself electronically to the authentication server in order to retrieve said transaction confirmation data.

24. The method of claim 1, wherein said transaction confirmation data is forwarded automatically by said authentication server to said service provider.

25. The method of claim 21, wherein said service provider sends a confirmation to said mobile user as soon as he has retrieved said transaction confirmation data from said authentication server.

26. The method of claim 1, wherein said mobile device includes an identification module for identifying the user of the mobile device.

27. The method of claim 1, wherein said centralized authentication server can provide said authentication while maintaining the anonymity of each of said users with respect to said service providers.

28. A WAP server for use by one of a plurality of service providers in conjunction with a predetermined central authentication server and a plurality of mobile users each using a corresponding WAP-capable mobile device, said WAP server comprising:

a storage area for storing a plurality of WAP cards including WAP cards having display data representing products and/or services for sale by the one of the service providers and also including WAP cards having a script containing transaction confirmation data;

a WAP serving section for serving one or more of said WAP cards having display data to at least one of the plurality of mobile users via the corresponding mobile device without using said central authentication server, wherein one or more of said WAP cards having the script containing transaction confirmation data is sent to the centralized authentication server if one or more of said products and/or services is selected by the at least one of the users for purchase, said selecting done by using a WAP browser of the at least one user's corresponding mobile device, and wherein said centralized authentication server is for providing authentication between said at least one of said users and the one of the service providers having the selected products and/or services with one or more of said users and said service providers being billed for said authentication, and further wherein said centralized server also provides authentication between additional ones of the users each having a corresponding WAP-capable mobile device and various additional ones of the service providers each having a corresponding WAP server, as defined herein, for additional transactions, thereby providing shared centralized authentication between said plurality of users and said plurality of service providers for the purchase of additional products and/or services.

29. The WAP server of claim 28, wherein said centralized authentication server can provide said authentication while maintaining the anonymity of the users with respect to the service providers.

30. The WAP server of claim 28, wherein said script is a WML script and wherein said confirmation data is sent as USSD.

31. The WAP server of claim 30, wherein said USSD includes a service provider identification.

32. The WAP server of claim 30, wherein one or more of said WAP cards comprises a time stamp that determines the time of download of the WAP card and in that said script makes a copy of this time stamp in said USSD.

33. The WAP server of claim 30, wherein said USSD includes a session identification.

34. The WAP server of claim 30, wherein said USSD includes a secret known only to the service provider.

35. The WAP server of claim 34, wherein said secret includes a random number set by said service provider.

36. A central authentication server for authenticating transactions between each of a plurality of users each using corresponding mobile devices with various ones of a plurality of service providers, wherein each of said service providers can provide each one said users with information representing products and/or services for sale by said provider for display on the corresponding mobile device without using said central authentication server, said central authentication server comprising:
    a wireless interface for connecting to a mobile radio network for receiving USSD messages having a predetermined USSD Service Request Code from said mobile devices;
    a transaction database for storing transaction confirmation data obtained from said USSD messages, and for storing a plurality of data representing transactions between a number of said mobile users and various ones of said service providers, wherein said transactions represent desired purchases by said mobile users of said products and/or services of one or more of said service providers; and
    means for authenticating said transactions, wherein
    one or more of said users and said service providers is billed for said authenticating.

37. The authentication server of claim 36, further comprising a http server with which said service providers can connect over the Internet to check whether said transaction confirmation data has arrived.

38. The authentication server of claim 36, further comprising an authentication module that can authenticate said service providers before these can retrieve said transaction confirmation data.

39. The authentication server of claim 36, further comprising at least one application program that is executed by said server when a certain flag is set in the incoming USSD.

40. The authentication server of claim 36, further comprising a user database in which mobile user indications are stored, wherein
    at least a certain number of these mobile user indications are linked with said transaction confirmation data.

41. The authentication server of claim 36, wherein the incoming USSD are electronically signed.

42. The authentication server of claim 36, wherein the incoming USSD are provided with a time stamp.

43. The authentication server of claim 36, further comprising a profile for each registered service provider.

44. The WAP server of claim 36, wherein said central authentication server provides anonymity of the users with respect to the service providers.

45. A system for authenticating transactions between each of a plurality of users each using a corresponding mobile device and various ones of a plurality of service providers, said system comprising:
    a central authentication server provided by a communication provider as a service to said users and service providers;
    a plurality of service provider servers, each corresponding to one of said plurality of service providers and adapted for providing data representing products and/or services for sale by said corresponding service provider to the corresponding mobile devices of some number of users; and
    a communication network provided by the communication provider for connecting said plurality of service provider servers with said plurality of mobile devices and with said central authentication server, wherein
    each of said service provider servers is adapted for sending said data, via said communication network without using said central authentication server, to the mobile devices of various ones of the users for displaying information about said products and/or services provided by the service provider corresponding to each of the service provider servers, and further wherein
    when one or more of the various users, using the user's corresponding mobile device, selects one or more of the plurality of products and/or services for purchase, the corresponding mobile device then sends transaction confirmation data to said central authentication server, via said communication network, for authenticating the users of the mobile devices with the service provider servers corresponding to the selected products and/or services.

46. The system of claim 45, wherein said authentication server provides anonymity of the users with respect to the service providers.

47. A method for using a centralized authentication server for authenticating transactions between a plurality of users each having a corresponding mobile device and a plurality of service providers each having a corresponding service provider server, said method comprising the steps of:
    said service provider servers providing data to the corresponding mobile devices of various ones of the plurality of mobile users without using the centralized authentication server, said data representing products and/or services for sale;
    said mobile devices using said data to display, to the corresponding users, the products and/or services for sale;
    some number of said various ones of the mobile users using the corresponding mobile devices for selecting one or more of said products and/or services for purchase;
    in response to said selecting, forwarding transaction confirmation data automatically from the corresponding mobile devices of said some number of users to said central authentication server, wherein
    said central authentication server authenticates said some number of users for said service providers providing the selected products and/or services;
    said central authentication server providing said service providers of the selected products and/or services with confirmation of said authentication of said some number of users;
    said service providers providing said selected products and/or services to the some number of users that selected them; and billing one or more of said users and said service providers for said authentication.

48. The system of claim 47, wherein said authentication server provides anonymity of the users with respect to the service providers.

49. The system of claim 45, wherein said communication provider bills one or more of said users and said service providers for said authenticating.

* * * * *